Patented Feb. 26, 1952

2,587,017

UNITED STATES PATENT OFFICE 2,587,017

LUBRICATION OF CONVEYER APPARATUS FOR MEAT

William F. Weber, Chicago, Ill., assignor to Armour and Company, Chicago, Ill., a corporation of Illinois No Drawing. Application November 5, 1947, Serial No. 784,094

4 Claims. (Cl. 117—134)

This invention relates to the lubrication of conveyor apparatus for meat. The invention is particularly useful in the lubrication of trolleys, metal gambrels, etc.

In packing house operations, meat, etc. is normally carried upon trolleys mounted upon tracks, and, since the meat is suspended below the trolleys, the problem of lubricating the trolleys without injury to the meat has presented itself as a serious problem and one which has not been solved up to this time. It is common practice to clean the trolleys by washing them in a washing solution, and then to coat the trolleys with oil.

It is also common practice to tumble the trolleys in a revolving steel cylinder with leather findings, saw dust, or cleaning compound, after which the trolleys are coated with oil. Under the vibrations to which the trolleys are subjected at times, and also, under changes in temperature conditions, drops of oil fall from the trolleys and on to the meat. A slight drop of oil on a piece of meat causes the piece to be rejected when the same is inspected, and before the piece is passed on inspection, a large chunk of meat greater than the spot covered by oil has to be removed, thus producing waste, expense, and a marring of the meat portion. Furthermore, workmen handling the equipment get their hands oily and when they later handle meat often contaminate the meat and thus produce further loss. Transference of oil from the trolleys and gambrels to meat presents a serious problem in the packing industry.

An object of the present invention is to overcome the above disadvantages and to provide an improved process in which sufficient lubrication is provided for the trolleys, etc., while at the same time preventing the possibility of lubricant contaminating the meat. A further object is to provide a process for treatment of meat conveyor apparatus which furnishes a lubricant, while at the same time providing a container for the lubricant which maintains the lubricant in non-dripping form and permits handling without transferring oil to the hands. A still further object is to provide a process of treatment for meat conveyor apparatus which furnishes sufficient lubrication, while at the same time rendering innocuous any portion of the lubricating film or wax which may be dislodged during movement of the conveyors. Other specific objects and advantages will appear as the specifications proceed. Yet another object is to provide a process in which wax is applied to the equipment in such a manner as to form an extremely thin layer of almost microscopic depth which does not scrape off when scratched with the fingernail and yet provides highly effective lubrication for substantial periods of use.

The new process when first instituted may include the step of cleaning the trolleys, etc. to remove oil, rust, dirt, etc. In this operation, I prefer to boil the trolleys in a cleaning solution. I prefer to immerse the trolleys in a tank containing a wax mixture, hereinafter described in greater detail, which is maintained in a molten condition. After remaining in the molten wax for a period of time, the trolleys are elevated and allowed to drip over a drip pan. During the period of dripping, I prefer to subject the trolleys to a blast of air to cool the wax on them. The trolleys may then be moved to a section for drying, and after drying, may be placed again into their usual operation. After the process is well into operation in a plant it is found that cleaning is not necessary when the trolleys, etc., are to be rewaxed.

I find that the trolleys are sufficiently lubricated in such a manner to avoid dripping through the use of a wax and oil mixture, the wax being employed in sufficient quantity to cause the final product to set upon drying, and the oil being used in sufficient quantity to serve as a lubricant, while, at the same time, maintaining the wax in a plastic condition. For example, good results have been obtained by using a mixture in which paraffin wax, from 60 to 80% of the total, and oil, from 20 to 40% of the total, are used. Excellent results have been obtained by a wax and oil mixture in which the paraffin is approximately 70% and the oil is approximately 30% of the total.

I prefer to incorporate in the wax and oil mixture from 9 to 15% of a high melt point microcrystalline wax. The high melt wax may contain a small amount of petrolatum to render it plastic. When the high melt point wax just described is used, the proportions may be as follows: paraffin—60 to 65%, oil 20 to 30%, high melt point wax—9 to 15%. The above combination has a flash point over 400° F. and a fire point over 500° F.

It will be understood that the mechanism employed for cleaning the trolleys and lubricating them may be of any suitable form or construction. I find that the lubrication operation is very conveniently carried out by suspending a number of trolleys on a tree form carried by a trolley wheel. The trolley wheel, supporting a tree and the trolleys thereon, may be moved upon a section of rail over a tank containing wax at, say, 280°-300° F., and the section with the trolley trees and trolleys may then be lowered by means of a hoist, etc. to immerse the trolleys within the wax. The trolleys may be allowed to remain in the wax for about four minutes or longer. They are then lifted out and, after dripping for a while into the tank, are moved over a drip pan for a period. While in this position, a blast of air is put over the trolleys to cool the wax on them.

The trolley tree may then be moved to another section for drying and the trolleys thereafter returned to their usual operating positions.

The process is simple and inexpensive and permits the return of trolleys for lubrication as often as desired. It is found that with this treatment, effective lubrication is produced, while, at the same time, there is no contamination of the meat. Further the equipment may be handled without transferring oil to the hands and thus producing a contamination of meat. The oil provides excellent lubrication, and it is prevented from dripping by the wax container. Further, if under extreme vibrations a portion of the wax is dislodged and should fall upon the piece of meat, it does not cling to the meat, but bounces off leaving no oil stain thereon.

As a specific example of the process, the following may be set out:

A number of trolleys were placed within a tank filled with a cleaning solution and were boiled to remove all oil and dirt accumulations on the trolleys. The trolleys were then suspended upon a tree carried by a trolley wheel and mounted on a rail. The rail was lowered by means of a hoist so as to immerse the trolleys within a tank containing a wax mixture maintained at a temperature of 280° F. The wax mixture was of the following formula:

Paraffin wax (125-7 A. N. P. Melt Point)— 65%, lubricating oil—25%, microcrystalline wax and petrolatum—10%.

The above mixture had a flash point over 400° F. and a fire point over 500° F. After the trolleys had remained in the wax for four minutes, they were lifted out and allowed to drip awhile. They were then moved over a drip pan and subjected to a blast of air to cool the wax. The tree of trolleys was then moved to another section or rail for drying. It takes approximately three-fourths of an hour to one hour to set during this drying operation depending on the room temperature. After drying, the trolley trees were moved along the rail to a point where they were to be used or were conveyed by trucks to special points for use.

In earlier operations when the trolleys were dipped into the hot wax bath, say for a minute or a half minute, the wax layer built up heavily upon the trolley body and tended to drop off under use. For example, when the trolley was immersed for a period of one-half minute, it came out of the bath with a wax coating $\frac{1}{16}''$ in depth. This coating was unstable and tended to drop off and did not provide the continuous lubrication needed. I have discovered that when the trolley is left in the bath sufficiently long to bring the temperature of the trolley substantially up to the temperature of the wax bath, that a surprising effect takes place in that the coating now is of almost microscopic depth and is not scraped off when the fingernail is pressed along the surface of the trolley. Instead, the extremely thin coating tenaciously adheres to the body of the trolley and remains in position during use for long periods of time. Further, the extremely thin layer is unusually effective as a lubricant. By way of example, when the bath of the wax is from 285°-300° F., if the trolley is allowed to remain in the wax for a period of five minutes or more, the temperature of the trolley is raised to approximate that of the bath and the desired fine film of wax lubricant is formed on the trolley. A substantially shorter period produces a thicker coating upon the trolley and one that is not satisfactory. The new effect in the character of the coating is produced where the temperature of the trolley or other equipment to be immersed is in the neighborhood of that of the wax bath.

Operations employing the process described have resulted in effective lubrication of the trolleys without any spoilage of meat. There is a large saving of labor which, before, was required in the removal of oil-spotted portions, and a large saving in the product which, with the new process, does not have to be trimmed.

While, in the foregoing specifications, I have set forth a specific embodiment of the invention as illustrated thereon and in considerable detail, it will be understood that such details may be varied widely by those skilled in the art without departing from the spirit of my invention.

I claim:

1. In a process for lubrication of conveyor apparatus for meat, the steps of heating to a molten condition a solution comprising about 65% paraffin wax, about 25% oil, and about 10% microcrystalline petrolatum wax, immersing the apparatus in the solution for an interval sufficient to heat the apparatus to substantially the temperature of the solution, withdrawing the apparatus from the solution, and drying the same.

2. In a process for lubrication of conveyor apparatus for meat, the steps of heating to a molten condition a solution comprising about 65% paraffin wax, about 25% oil, and about 10% microcrystalline petrolatum wax, immersing the apparatus in the solution for at least four minutes, withdrawing the apparatus from the solution, and drying the same.

3. In a process for lubrication of conveyor apparatus for meat, the steps of heating to a temperature of approximately 280°-300° F. a solution of paraffin wax containing oil and a small percentage of microcrystalline petrolatum wax, immersing the apparatus in the solution for at least four minutes, withdrawing the apparatus from the solution, and drying the same.

4. In a process for lubrication of conveyor apparatus for meat, the steps of heating to a temperature of approximately 280°-300° F. a solution comprising about 65% paraffin wax, about 25% oil, and about 10% microcrystalline petrolatum wax, immersing the apparatus in the solution for at least four minutes, withdrawing the apparatus from the solution, and drying the same.

WILLIAM F. WEBER.

REFERENCES CITED

The following references are of record in the file of this patent:

UNITED STATES PATENTS

| Number | Name | Date |
|---|---|---|
| 2,126,128 | Montgomery | Aug. 9, 1938 |
| 2,298,844 | Schilling | Oct. 13, 1942 |

FOREIGN PATENTS

| Number | Country | Date |
|---|---|---|
| 304,948 | Great Britain | Jan. 31, 1929 |